United States Patent Office 3,642,822
Patented Feb. 15, 1972

3,642,822
HEXAHYDROPYRROLOBENZODIAZEPINES
Jackson B. Hester, Jr., Portage, Mich., assignor to The
Upjohn Company, Kalamazoo, Mich.
No Drawing. Filed Nov. 3, 1969, Ser. No. 873,720
Int. Cl. C07d 53/02
U.S. Cl. 260—326.9      8 Claims

ABSTRACT OF THE DISCLOSURE 1,2,4,5,6,7 - Hexahydropyrrolo[3,2,1-jk][1,4]benzodiazepines, 1,2,4,5,6,7 - hexahydropyrrolo[1,2,3-ef][1,5]benzodiazepines, processes for preparing the same and intermediates used to prepare said benzodiazepines. The benzodiazepines have central nervous system stimulant and depressant activity.

BRIEF SUMMARY OF THE INVENTION

This invention relates to novel 1,2,4,5,6,7-hexahydropyrrolo[3,2,1-jk][1,4]benzodiazepines, 1,2,4,5,6,7 - hexahydropyrrolo[1,2,3-ef][1,5]benzodiazepines, processes for preparing the same and intermediates used to prepare said benzodiazepines by said processes.

The novel compounds of this invention have the formulae:

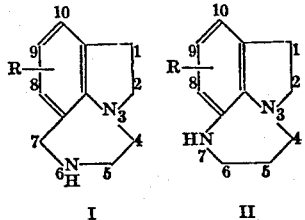

I   II wherein R is selected from the group consisting of hydrogen, methyl, ethyl, propyl, isopropyl, methoxy, ethoxy, propoxy, isopropoxy, and halogen.

The term "novel compounds of this invention," as used throughout the specification embraces the compounds represented by Formulae I and II above and the acid addition salts of said compounds.

The term "halogen" is inclusive of chlorine, bromine and fluorine.

The compounds of Formula I can be prepared by reducing the corresponding 1,2,4,5 - tetrahydropyrrolo[3,2,1-jk][1,4]-benzodiazepin - 7(6H) - ones (III) and the compounds of Formula II can be prepared by reducing the corresponding 1,2,4,5-tetrahydropyrrolo[1,2,3-ef][1,5]benzodiazepin-6(7H)-ones (IV). The reduction is illustrated by the following equations.

(A)

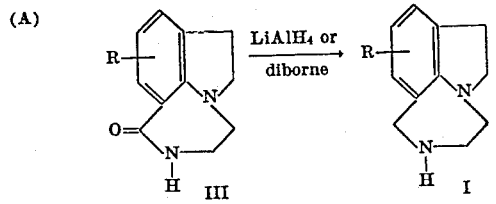

(B)

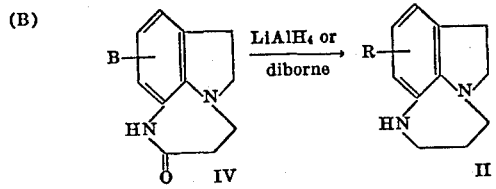

wherein R is the same as above.

DETAILED DESCRIPTION

In the processes illustrated by Equations A and B, the reduction is carried out with either lithium aluminum hydride or diborane in the presence of an inert solvent such as ether, tetrahydrofuran, dioxane or diglyme at a temperature of 0 to 100° C. and a reaction time of from 1 to 18 hours.

The 1,2,4,5 - tetrahydropyrrolo[3,2,1-jk][1,4]benzodiazepin-7(6H)-ones (III) and the 1,2,4,5-tetrahydropyrrolo[1,2,3-ef][1,5]benzodiazepin - 6(7H)-ones (IV), utilized in processes A and B respectively are prepared by processes illustrated by the following equations:

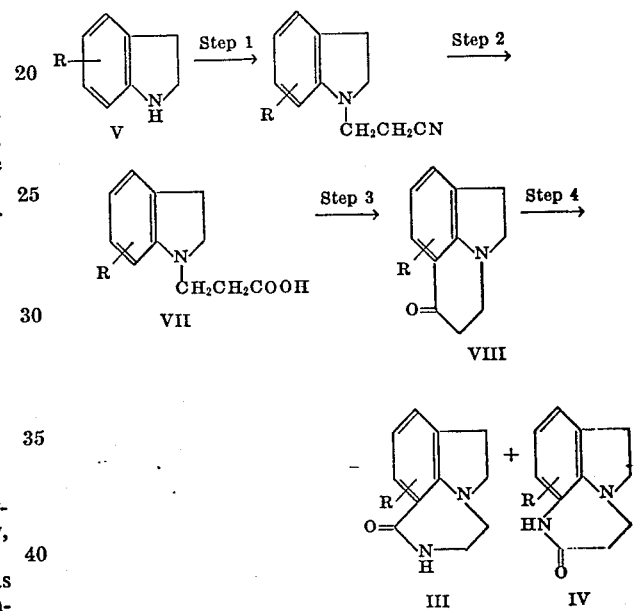

wherein R is the same as above.

Step 1 involves reacting the appropriate indoline (V) with acrylonitrile to form a 1-indolinepropionitrile (VI). In step 2, the 1-indolinepropionitrile is converted to the corresponding 1-indolinepropionic acid (VII). Step 3 involves heating the 1-indolinepropionc acid with polyphosphoric acid to form a 1,2,4,5 - tetrahydro - 6H-pyrrolo-[3,2,1-ij]quinolin-6-one (VIII). The conditions utilized in these three steps are described in considerable detail in Rapoport et al., J. Org. Chem. 23, 248 (1958).

In step 4, the 1,2,4,5-tetrahydro-6H-pyrrolo[3,2,1-ij]-quinolin-6-one (VIII) is reacted with sodium azide in the presence of polyphosphoric acid to form a mixture of 1,2,4,5 - tetrahydropyrrolo[3,2,1-jk][1,4]benzodiazepin-7(6H)-one (III) and 1,2,4,5-tetrahydropyrrolo[1,2,3-ef]-[1,5]benzodiazepin - 6(7H) - one (IV). These compounds are readily separated by conventional procedures, e.g. chromatography or fractional crystallization.

The preferred reaction temperature range is 50 to 60° C., however, higher or lower temperatures may be utilized if desired. The molar ratio of the ketone (VIII) to sodium azide is preferably 1:1 to 1:2 and the reaction time is from 1 to 5 hours.

The 9 - substituted-1,2,4,5-tetrahydropyrrolo[1,2,3-ef]-[1,5]benzodiazepin-6(7H)-ones of Formula IVa can also be prepared by the process illustrated by the following equation.

(D)

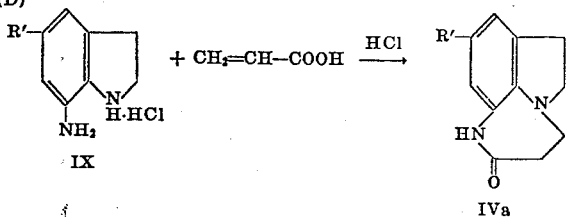

wherein R' is methyl, ethyl, propyl, isopropyl and halogen. This process is preferably conducted at a temperature range of 80°–110° C.; however, higher or lower temperatures may be used. The molar ratio of the indoline hydrochloride (IX) to acrylic acid can be 1:1 to 1:2 and the reaction time is from 0.5 to 2 hours.

The indolines (V) utilized in process C to prepare the 1,2,4,5 - tetrahydropyrrolo[3,2,1-jk][1,4]benzodiazepin-7(6H)-ones (III) and the 1,2,4,5-tetrahydropyrrolo[1,2,3-ef][1,5]benzodiazepin-6(7H)-ones (IV) are readily available either from commercial sources or from methods that are well known in the art. For example, a method for preparing indolines of the type used in method C is described in R. Ikan et al., Israel J. Chem. 2, 37 (1964).

The 7-aminoindoline hydrochlorides (IX) utilized in process D can be prepared by a method illustrated by the following equations.

(E)

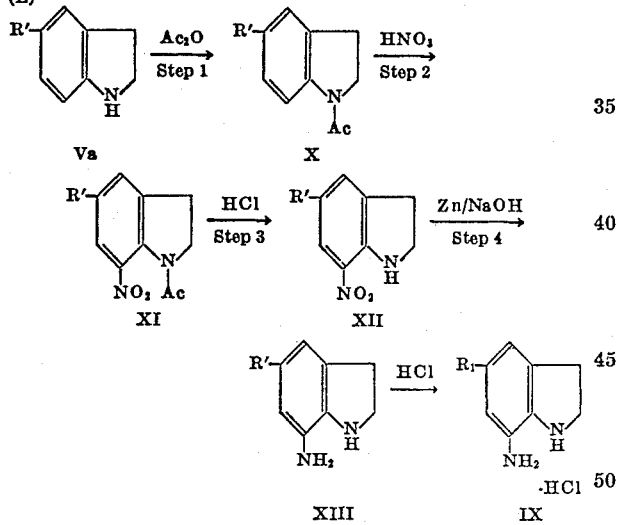

wherein R' is the same as above.

In step 1, the appropriate indoline (Va) is mixed with acetic anhydride to form the corresponding 1-acetylindoline (X).

In step 2, the 1-acetylindoline (X) is dissolved in an acetic anhydride-acetic acid mixture, cooled to 10–15° C. and then treated dropwise with a solution of fuming nitric acid in acetic acid. The mixture is kept at 10–15° C. for an additional 2 hours and then poured into water. The product, a 1-acetyl-7-nitroindoline (XI), is recovered by conventional procedures such as filtration.

In step 3, the 1-acetyl-7-nitroindoline (XI) is heated with an acid, e.g. a mixture of 6 N hydrochloric acid and methanol for 1 to 8 hours to form the 7-nitroindoline (XII).

In step 4, a mixture of the 7-nitroindoline (XII) and 20% aqueous sodium hydroxide is treated portionwise with zinc at reflux temperature. After the addition, the mixture is refluxed an additional hour to yield the 7-aminoindoline (XIII). The 7-aminoindoline is then neutralized with hydrogen chloride to form the corresponding 7-aminoindoline hydrochloride (IX).

The acid addition salts of the invention comprise the salts of the basic compounds of Formulae I, II, III and IV above with pharmacologically acceptable acids such as sulfuric, hydrochloric, nitric, phosphoric, lactic, benzoic, methanesulfonic, p-toluene-sulfonic, salicylic, acetic, propionic, maleic, malic tartaric, citric, cyclohexanesulfamic, succinic, nicotinic, ascorbic acids and the like.

The novel compounds of this invention having the Formulae I and II exhibit a broad range of central nervous system activity in animals, including mammals. For example, 1,2,4,5,6,7 - hexahydropyrrolo[3,2,1 - jk][1,4] benzodiazepine, 9 - chloro-1,2,4,5,6,7-hexahydropyrrolo-[3,2,1 - jk][1,4]benzodiazepine hydrochloride and 9-chloro - 1,2,4,5,6,7 - hexahydropyrrolo[1,2,3-ef][1,5]-benzodiazepine are nicotine antagonists when administered intraperitoneally to mice at dosages of 13 to 16 mg./kg.

The compound 1,2,4,5,6,7 - hexahydropyrrolo[3,2,1-jk][1,4]-benzodiazepine acts as a stimulant when administered to rats intraperitoneally at dosages of 6 to 10 mg./kg. and the compound 9-chloro-1,2,4,5,6,7-hexahydropyrrolo[3,2,1-jk][1,4]-benzodiazepine hydrochloride acts as a stimulant when administered intraperitoneally to mice in dosages of 10 to 30 mg./kg. The latter compound also exhibits anorexigenic activity when mixed with food and administered orally to mice at dosages of 28 to 325 mg./kg. during 24 hours.

The compound 9 - chloro-1,2,4,5,6,7-hexahydropyrrolo[1,2,3-ef][1,5]benzodiazepine also exhibits sedative activity in mice when administered intraperitoneally in dosages of 100 to 200 mg./kg.

The compound 1,2,4,5,6,7 - hexahydropyrrolo[1,2,3-ef][1,5]-benzodiazepine dihydrochloride acts as an acute hypotensive agent when administered orally to rats in a dosage of 50 mg./kg.

The intermediates illustrated by Formulae III and IV also exhibit pharmacological activity. For example, 9-chloro - 1,2,4,5 - tetrahydropyrrolo[1,2,3-ef][1,5]benzodiazepin-6(7H)-one acts as a nicotine antagonist when administered intraperitoneally to mice in dosages of 36 to 50 mg./kg.

Some of the compounds exhibit antidiabetic activity. Illustratively, the compound 1,2,4,5,6,7 - hexahydropyrrolo[1,2,3-ef][1,5]benzodiazepine dihydrochloride shows antidiabetic activity when administered intraperitoneally to mice in a dosage of 100 mg./kg.

For purposes of administration to birds and to mammals, including animals of economic value such as horses, cattle, sheep, pigs, mice, rats, rabbits and the like, the novel compounds of the invention can be combined with solid or liquid pharmaceutical carriers and formulated in the form of tablets, powder packets, capsules and the like solid dosage forms, using starch and like excipients, or dissolved in suitable solvents or vehicles for oral or parenteral administration.

The basic compounds and intermediates of this invention also form thiocyanic acid addition salts which, when condensed with formaldehyde, form resinous materials useful as pickling inhibitors according to U.S. Pats. 2,425,320 and 2,606,155. Also, the fluosilicic acid addition salts of said basic compounds and intermediates are useful as mothproofing agents according to U.S. Pats. 1,915,334 and 2,075,359.

The following examples are set forth to illustrate my invention and to enable persons skilled in the art to better understand and practice the invention and are not intended to limit the same.

EXAMPLE 1

*1,2,4,5 - tetrahydropyrrolo[3,2,1 - jk][1,4]benzodiazepin-7(6H)-one and 1,2,4,5 - tetrahydropyrrolo[1,2,3-ef]-[1,5]benzodiazepin-6-(7H)-one*

(a) Mixture of 1,2,4,5-tetrahydropyrrolo[3,2,1-jk][1,4] - benzodiazepin-7(6H)-one and 1,2,4,5-tetrahydropyrrolo[1,2,3-ef][1,5]-benzodiazepin - 6(7H) - one.—A stirring mixture of 15.0 g. (0.0867 mole) of 1,2,4,5-tetrahydro-(6H)-pyrrolo[3,2,1-ij]quinoline-6-one and 450 g. of polyphosphoric acid is warmed under nitrogen to 50° C. and treated over a period of one hour with 7.35 g. (0.113 mole) of sodium azide. The reaction mixture is stirred an additional 3.5 hours at 50° C. and then poured into 4 l. of ice water. The resulting mixture is stirred until solution is obtained. The solution is made alkaline with 50% aqueous sodium hydroxide and extracted with chloroform. The chloroform extract is washed with water, dried over anhydrous potassium carbonate and concentrated under reduced pressure to yield a mixture of 1,2,4,5-tetrahydropyrrolo - [3,2,1-jk][1,4] - benzodiazepin-7(6H)-one and 1,2,4,5 - tetrahydropyrrolo[1,2,3-ef][1,5] - benzodiazepin-6(7H)-one.

(b) 1,2,4,5 - tetrahydropyrrolo[1,2,3-ef][1,5]benzodiazepin-6(7H)-one.—The residue prepared in part (a) is chromatographed on 800 g. of silica gel (elution with 15% methanol-85% ethyl acetate) and the eluate is collected in 100-ml. fractions. Fractions 15–23 are combined and then recrystallized successively from ethyl acetate-Skellysolve B hexanes and methylene chloride-ethyl acetate to yield 1,2,4,5 - tetrahydropyrrolo[1,2,3 - ef][1,5]benzodiazepin-6(7H)-one, melting point 163–164° C.

*Analysis.*—Calcd. for $C_{11}H_{12}N_2O$ (percent): C, 70.18; H, 6.43; N, 14.88. Found (percent): C, 69.95; H, 6.67; N, 14.80.

(c) 1,2,4,5 - tetrahydropyrrolo[3,2,1-jk][1,4]benzodiazepin-7(6H)-one.—Fractions 27–50 eluted during the chromatography in part (b) above are combined and recrystallized twice from ethyl acetate to yield 1,2,4,5-tetrahydropyrrolo[3,2,1-jk][1,4]benzodiazepin - 7(6H) - one, melting point 151–152.5° C.

*Analysis.*—Calcd. for $C_{11}H_{12}N_2O$ (percent): C, 70.18; H, 6.43; N, 14.88. Found (percent): C, 70.31; H, 6.39; N, 15.08.

EXAMPLE 2

*1,2,4,5,6,7-hexahydropyrrolo[3,2,1-jk][1,4]-benzodiazepine*

A solution of 188 g. (0.01 mole) of 1,2,4,5-tetrahydropyrrolo[3,2,1-jk][1,4]benzodiazepin-7(6H)-one in 100 ml. of dry tetrahydrofuran is added under nitrogen to an ice-cold, stirred suspension of lithium aluminum hydride (1.88 g.) in 100 ml. of tetrahydrofuran. The resulting mixture is refluxed for 18 hours, cooled in an ice bath and treated successively with 1.88 ml. of water, 1.88 ml. of 15% aqueous sodium hydroxide and 5.64 ml. of water. The mixture is filtered and the filtrate collected and concentrated in vacuo. The residue is recrystallized twice from ethyl acetate-Skellysolve B hexane to give 1,2,4,5,6,7-hexahydropyrrolo[3,2,1-jk][1,4]benzodiazepine, melting point 67–68° C.

*Analysis.*—Calcd. for $C_{11}H_{14}N_2$ (percent): C, 75.82; H, 8.19; N, 16.08. Found (percent): C, 75.50; H, 8.15; N, 16.17.

EXAMPLE 3

*1,2,4,5,6,7-hexahydropyrrolo[1,2,3-ef][1,5]-benzodiazepin and dihydrochloride thereof*

A solution of 1.74 g. (0.00925 mole) of 1,2,4,5-tetrahydropyrrolo[1,2,3-ef][1,5]benzodiazepin-6(7H) - one in 50 ml. of dry tetrahydrofuran is added, under nitrogen, to a stirred ice-cold suspension of 1.74 g. of lithium aluminum hydride in 150 ml. of tetrahydrofuran. The resulting mixture is refluxed for 18 hours, cooled in an ice bath and treated succesively with 1.74 ml. of water, 1.74 ml. of 15% aqueous sodium hydroxide and 5.22 ml. of water. The solid which results is collected by filtration, and the filtrate is concentrated under reduced pressure. A solution of the residue in ethyl acetate is acidified with methanolic hydrogen chloride, and the resulting solid is collected by filtration and dried. The solid is then recrystallized from methanolic hydrogen chloride to yield 1,2,4, 5,6,7 - hexahydropyrrolo[1,2,3 - ef][1,5]benzodiazepine dihydrochloride, melting point 227–231° C.

*Analysis.*—Calcd. for $C_{11}H_{14}N_2 \cdot 2HCl$ (percent): C, 53.45; H, 6.53; Cl, 28.69; N, 11.34. Found (percent): C, 53.67; H, 6.40; Cl, 28.26; N, 11.35.

The free base is prepared by basifying the dihydrochloride with aqueous sodium hydroxide, extracting with ether, and evaporating the extract to dryness.

EXAMPLE 4

*9-chloro - 1,2,4,5 - tetrahydropyrrolo[3,2,1-jk][1,4]benzodiazepin-7(6H)-one and 9-chloro-1,2,4,5-tetrahydropyrrolo[1,2,3-ef][1,5]benzodiazepin-6(7H)-one*

(a) Mixture of 9-chloro-1,2,4,5-tetrahydropyrrolo[3,2, 1 - jk] - [1,4]benzodiazepin - 7(6H) - one and 9 - chloro-1,2,4,5 - tetrahydropyrrolo[1,2,3 - ef][1,5]benzodiazepin-6(7H)-one.—A stirred mixture of 4.15 g. (0.02 mole) of 8 - chloro - 1,2,4,5 - tetrahydro - (6H)-pyrrolo[3,2,1-ij]-quinolin-6-one and 120 g. of polyphosphoric acid is heated under nitrogen to 50–60° C. and treated portionwise with 1.69 g. (0.026 mole) of sodium azide over a period of 1 hour. The mixture is kept at a temperature of 50–60° C. for an additional 4 hours and then poured into ice water. The resulting solution is rendered alkaline with 50% aqueous sodium hydroxide and extracted several time with chloroform. The combined extract is washed with a saturated aqueous solution of sodium chloride, dried over anhydrous magnesium sulfate and concentrated under reduced pressure to yield a mixture of 9-chloro-1,2,4,5-tetrahydropyrrolo[3,2,1 - jk][1,4] - benzodiazepin-7(6H)-one and 9 - chloro - 1,2,4,5 - tetrahydropyrrolo[1,2,3-ef]-[1,5]benzodiazepin-6(7H)-one.

Using the procedure described in Example 4, part (a), but replacing 8 - chloro - 1,2,4,5-tetrahydro-(6H)-pyrrolo-[3,2,1-ij]-quinolin-6-one by the appropriately substituted 1,2,4,5 - tetrahydro - (6H) - pyrrolo[3,2,1-ij]-quinolin-6-one is productive of a mixture of the corresponding 1,2,4, 5 - tetrahydropyrrolo[3,2,1-jk][1,4]benzodiazepin-7(6H)-one and 1,2,4,5-tetrahydropyrrolo[1,2,3-ef][1,5]benzodiazepin-6(7H)-one.

(b) 9 - chloro - 1,2,4,5 - tetrahydropyrrolo[3,2,1 - jk]-[1,4]benzodiazepin-7(6H)-one.—The above mixture of 9 - chloro-1,2,4,5-tetrahydropyrrolo[3,2,1-jk][1,4]benzodiazepin-7(6H)-one and 9-chloro-1,2,4,5-tetrahydropyrrolo-[1,2,3-ef][1,5]benzodiazepin-6(7H)-one is dissolved in methanol-ethyl acetate (decolorizing charcoal treatment). The solution is filtered and cooled and the solid that precipitates is separated by filtration. The solid is then recrystallized from methylene chloride-ethyl acetate to yield 9 - chloro - 1,2,4,5-tetrahydropyrrolo[3,2,1-jk][1,4]-benzodiazepin-7(6H)-one, melting point 201.5–202° C.

*Analysis.*—Calcd. for $C_{11}H_{11}ClN_2O$ (percent): C, 59.33; H, 4.98; Cl, 15.92; N, 12.58. Found (percent): C, 58.97; H, 5.07; Cl, 16.08; N, 12.09.

(c) 9 - chloro - 1,2,4,5 - tetrahydropyrrolo[1,2,3 - ef]-[1,5]benzodiazepin-6(7H)-one.—The filtrate from the methanol-ethyl acetate recrystallization described in Example 4, part (b) is concentrated and chromatographed on 150 g. of silica gel with 5% methanol-95% ethyl acetate; 50-ml. fractions are collected. Fractions 6–10 are collected and crystallized from ethyl acetate to give 0.249 g. of crude product. This crude product is recrystallized from a mixture of ethyl acetate and Skellysolve B hexanes to yield 9-chloro - 1,2,4,5 - tetrahydropyrrolo-[1,2,3-ef][1,5]benzodiazepin - 6(7H) - one, melting point 169.5–170° C.

*Analysis.*—Calcd. for $C_{11}H_{11}ClN_2O$ (percent): C, 59.33; H, 4.98; Cl, 15.92; N, 12.58. Found (percent): C, 59.65; H, 4.98; Cl, 16.06; N, 12.38.

Further elution of the column with 10% methanol-90% ethyl acetate yields 9-chloro-1,2,4,5-tetrahydropyrrolo-[3,2,1 - jk][1,4]benzodiazepin - 7(6H)-one, identical with the product of part (b) above.

EXAMPLE 5

9-chloro-1,2,4,5,6,7-hexahydropyrrolo[3,2,1-jk][1,4]-benzodiazepine and hydrochloride thereof A solution of 1.0 g. (0.0045 mole) of 9-chloro-1,2,4,5-tetrahydropyrrolo[3,2,1 - jk][1,4]benzodiazepin - 7(6H)-one in 100 ml. of tetrahydrofuran is added under nitrogen to a stirred, refluxing suspension of 1.0 g. of lithium aluminum hydride in 100 ml. of tetrahydrofuran. The resulting mixture is refluxed for 18 hours, cooled in an ice bath and treated successively with 1.0 ml. of water, 1.0 ml. of 15% aqueous sodium hydroxide and 3.0 ml. of water. The solid is collected by filtration and the filtrate is concentrated under reduced pressure. An ethyl acetate solution of the residue is acidified with methanolic hydrogen chloride and the resulting salt is crystallized from methanol-ethyl acetate to yield 0.935 g. of crude product. The crude product is recrystallized from methanol-ethyl acetate to give 9-chloro-1,2,4,5,6,7-hexahydropyrrolo[3,2,1-jk][1,4]benzodiazepine hydrochloride, melting point 281° C. (dec.).

*Analysis.*—Calcd. for $C_{11}H_{13}ClN_2 \cdot HCl$ (percent): C, 53.89; H, 5.76; Cl, 28.93; N, 11.43. Found (percent): C, 54.05; H, 5.78; Cl, 28.97; N, 11.27.

The free base is prepared by basifying the hydrochloride with aqueous sodium hydroxide, extracting with ether, and evaporating the extract to dryness.

Using the procedure described in Example 5, but replacing 9 - chloro - 1,2,4,5 - tetrahydropyrrolo[3,2,1 - jk][1,4]benzodiazepin-7(6H)-one by the appropriately substituted 1,2,4,5-tetrahydropyrrolo[3,2,1 - jk][1,4]benzodiazepin-7(6H)-ones is productive of the corresponding 1,2,4,5,6,7 - hexahydropyrrolo[3,2,1 - jk][1,4]benzodiazepines and acid addition salts thereof. Representative of the 1,2,4,5,6,7 - hexahydropyrrolo[3,2,1-jk][1,4]benzodiazepines so prepared are 8-methyl-, 9-methyl-, 10-methyl-, 8-ethyl-, 9-ethyl-, 9-propyl-, 9-isopropyl-, 8-methoxy-, 9-methoxy-, 10-methoxy-, 9-ethoxy-, 8-propoxy-, 9-isopropoxy-, 8-ethoxy-, 8-chloro-, 8-bromo-, 8-fluoro-, 9-fluoro-, 9-bromo-, and 10-chloro-1,2,4,5,6,7-hexahydropyrrolo[3,2,1-jk][1,4]-benzodiazepine.

EXAMPLE 6

9-chloro-1,2,4,5,6,7-hexahydropyrrolo-[1,2,3-ef][1,5]benzodiazepine

A solution of 1.0 g. (0.0045 mole) of 9-chloro-1,2,4,5-tetrahydropyrrolo[1,2,3 - ef][1,5]benzodiazepin - 6(7H)-one in 100 ml. of tetrahydrofuran is added under nitrogen to a stirred, refluxing suspension of 1.0 g. of lithium aluminum hydride in 100 ml. of tetrahydrofuran. The resulting mixture is refluxed for 8 hours, cooled in an ice bath and treated successively with 1.0 ml. of water, 1.0 ml. of 15% aqueous sodium hydroxide and 3.0 ml. of water. The solid is collected by filtration and the filtrate is concentrated under reduced pressure. Chromatography of the residue on silica gel (150 g.) with 30% ethyl acetate-70% cyclohexane gives the desired product which is crystallized from ethylacetate-Skellysolve B hexanes to yield 0.681 g. of crude product. This product is recrystallized from ethyl acetate-Skellysolve B hexanes to yield 9-chloro - 1,2,4,5,6,7 - hexahydropyrrolo[1,2,3-ef][1,5]benzodiazepine, melting point 77.5–78.5° C.

*Analysis.*—Calcd. for $C_{11}H_{13}ClN_2$ (percent): C, 63.30; H, 6.28; Cl, 16.99; N, 13.43. Found (percent): C, 63.68; H, 6.60; Cl, 17.20; N, 13.19.

Using the procedure described in Example 6, but replacing 9-chloro-1,2,4,5-tetrahydropyrrolo[1,2,3-ef][1,5]benzodiazepin-6(7H)-one by the appropriately substituted 1,2,4,5 - tetrahydropyrrolo[1,2,3 - ef][1,5]benzodiazepin-6(7H)-ones is productive of the corresponding 1,2,4,5,6,7-hexahydropyrrolo[1,2,3-ef][1,5]benzodiazepines. Representative of the 1,2,4,5,6,7-hexahydropyrrolo[1,2,3-ef][1,5]benzodiazepines so prepared are 8-chloro-, 8-bromo-, 8-fluoro-, 9-bromo-, 10-chloro-, 10-bromo-, 9-fluoro-, 8-methyl-, 8-ethyl-, 8-propyl-, 8-isopropyl-, 9-ethyl-, 9-propyl-, 9-isopropyl-, 9-methyl-, 10-methyl-, 10-ethyl-, 8-methoxy-, 9-methoxy-, 10-methoxy-, 9-ethoxy-, 9-propoxy-, 9-isopropoxy-, 8-ethoxy-, and 10-propoxy-1,2,4,5,6,7-hexahydropyrrolo-[1,2,3-ef][1,5]benzodiazepine.

EXAMPLE 7

7-amino-5-chloroindoline hydrochloride

A stirred mixture of 19.9 g. (0.1 mole) of 5-chloro-7-nitroindoline, 52 ml. of 95% ethanol and 8 ml. of 20% aqueous sodium hydroxide is warmed under nitrogen to the reflux temperature and treated, portionwise, with 26 g. of zinc dust at such a rate that the mixture refluxes without external heating. An additional 13 ml. of ethanol is added and the mixture is refluxed for 1 hour, cooled and filtered. The solid is washed with ether. The combined filtrate and washing is treated with 1 g. of sodium hydrosulfite and concentrated in vacuo. A suspension of the residue in water is extracted with ether, and the extract is washed with a saturated aqueous solution of sodium chloride, dried over anhydrous potassium carbonate and concentrated in vacuo. A solution of the residue in ethanol is cooled in an ice bath and acidified with methanolic hydrogen chloride. The resulting crystalline solid is collected by filtration and washed with ethanol. A small amount of additional solid is obtained by concentrating the filtrate. The combined solid is recrystallized from ethanol (decolorizing charcoal treatment) to yield 11.449 g. of crude product. The crude product is recrystallized from ethanol to yield 7-amino-5-chloroindoline hydrochloride, melting point 218.5–220° C. (dec.).

*Analysis.*—Calcd. for $C_8H_9ClN_2 \cdot HCl$ (percent): C, 46.85; H, 4.91; Cl, 34.58; N, 13.66. Found (percent): C, 46.85; H, 4.88; Cl, 34.80; N, 13.51.

Using the procedure described in Example 7, but replacing 5-chloro-7-nitroindoline by the appropriately substituted 7-nitroindoline is productive of the corresponding 7-aminoindoline hydrochloride.

EXAMPLE 8

9-chloro-1,2,4,5-tetrahydropyrrolo[1,2,3-ef][1,5]benzodiazepine-6(7H)-one

A mixture of 20.5 g. (0.10 mole) of 7-amino-5-chloroindoline hydrochloride, 10.8 g. (0.15 mole) of acrylic acid and 15 ml. of 5.7 N hydrochloric acid is heated on a steam bath for 1.5 hours. The mixture goes into solution and then solidfies. The solid is collected, suspended in water and made ammoniacal with concentrated ammonium hydroxide. The resulting mixture is stirred 1 hour and filtered. The solid is washed with water, dried and recrystallized from ethyl acetate to obtain a 63% yield of 9-chloro-1,2,4,5-tetrahydropyrrolo[1,2,3 - ef][1,5]benzodiazepin-6(7H)-one in three crops: 9.46 g., melting point 168–170° C.; 3.15 g., melting point 166.5–168.5° C.; and 1.43 g., melting point 167–168.5° C.

I claim:

1. A compound selected from the group consisting of
(a) A compound having the formula

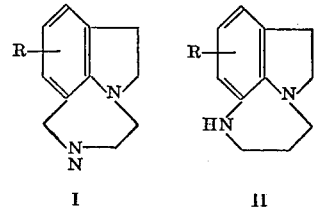

wherein R is selected from the group consisting of hydrogen, methyl, ethyl, propyl, isopropyl, methoxy, ethoxy, propoxy, isopropoxy, and halogen; and
(b) The addition salts with pharmacologically acceptable acids of the compound of the above formulae.

2. A compound of claim 1 having the formula of I.
3. A compound of claim 2 wherein R is hydrogen.
4. A compound of claim 2 wherein R is 9-chloro.
5. A compound of claim 1 having the formula of II.
6. A compound of claim 5 wherein R is hydrogen.
7. The dihydrochloride of the compound of claim 6.
8. A compound of claim 5 wherein R is 9-chloro.

References Cited

UNITED STATES PATENTS 3,466,297  9/1969  Sulkowski et al. ____ 260—326.1
3,466,298  9/1969  Sulkowski et al. ____ 260—326.1

OTHER REFERENCES

Theilheimer, Synthetic Methods of Organic Chemistry (1958), vol. 12:513.

ALEX MAZEL, Primary Examiner

J. A. NARCAVAGE, Assistant Examiner

U.S. Cl. X.R.

252—401; 260—239.3 T, 326.11, 326.5 B; 424—274

UNITED STATES PATENT OFFICE
CERTIFICATE OF CORRECTION

Patent No. 3,642,822  Dated February 15, 1972

Inventor(s) Jackson B. Hester, Jr.

It is certified that error appears in the above-identified patent and that said Letters Patent are hereby corrected as shown below:

Column 1, line 56, for "diborne" read -- diborane --. Column 1, line 66, for "diborne" read -- diborane --. Column 3, line 45, for "$R_1$" read -- R' --. Column 4, line 6, for "malic tartaric" read -- malic, tartaric --. Column 5, line 1, for "quinoline-" read -- quinolin- --. Column 5, line 41, for "188 g." read -- 1.88 g. --. Column 5, line 51, for "hexane" read -- hexanes --. Column 5, line 55, for "8.19" read -- 8.10 --. Column 5, line 60, for "benzodiazepin" read -- Benzodiazepine --. Column 8, line 68, for "N" read -- H --.

Signed and sealed this 26th day of December 1972.

(SEAL)
Attest:

EDWARD M. FLETCHER, JR.
Attesting Officer

ROBERT GOTTSCHALK
Commissioner of Patents